(12) United States Patent
Lee

(10) Patent No.: US 11,895,355 B2
(45) Date of Patent: Feb. 6, 2024

(54) METHOD AND SYSTEM FOR EFFECTIVE ADAPTIVE BITRATE STREAMING

(71) Applicant: NAVER CORPORATION, Seongnam-si (KR)

(72) Inventor: Jaeho Lee, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 101 days.

(21) Appl. No.: 17/449,735

(22) Filed: Oct. 1, 2021

(65) Prior Publication Data

US 2022/0021928 A1  Jan. 20, 2022

Related U.S. Application Data

(63) Continuation of application No. PCT/KR2020/004004, filed on Mar. 24, 2020.

(30) Foreign Application Priority Data

Apr. 3, 2019 (KR) .......................... 10-2019-0038956

(51) Int. Cl.
| | | |
|---|---|---|
| *H04N 21/433* | (2011.01) | |
| *H04N 21/2662* | (2011.01) | |
| *H04N 21/442* | (2011.01) | |
| *H04N 21/658* | (2011.01) | |
| *H04N 21/845* | (2011.01) | |
| *H04N 21/2343* | (2011.01) | |
| *H04N 21/462* | (2011.01) | |

(52) U.S. Cl.
CPC ... *H04N 21/4331* (2013.01); *H04N 21/23439* (2013.01); *H04N 21/2662* (2013.01); *H04N 21/44209* (2013.01); *H04N 21/4621* (2013.01); *H04N 21/6581* (2013.01); *H04N 21/8456* (2013.01)

(58) Field of Classification Search
CPC ........... H04N 21/4331; H04N 21/2662; H04N 21/44209; H04N 21/4621; H04N 21/6581; H04N 21/8456; H04N 21/23439
See application file for complete search history.

(56) References Cited

U.S. PATENT DOCUMENTS

| | | | | |
|---|---|---|---|---|
| 6,108,800 A | * | 8/2000 | Asawa | G06F 11/3409 714/26 |
| 11,140,429 B1 | * | 10/2021 | Johnson | H04N 21/23655 |
| 2012/0005368 A1 | * | 1/2012 | Knittle | H04N 21/23805 375/E7.02 |

(Continued)

FOREIGN PATENT DOCUMENTS

| | | | |
|---|---|---|---|
| EP | 3035628 A1 | * | 6/2016 |
| JP | 2010206446 A | * | 9/2010 |

(Continued)

OTHER PUBLICATIONS

ISR issued in PCT/KR2020/004004, dated Jul. 2, 2020.

*Primary Examiner* — Robert J Hance
(74) *Attorney, Agent, or Firm* — Greer Burns & Crain Ltd.

(57) ABSTRACT

A video playback method executed in a computer system includes measuring a bitrate in transport stream (TS) file units, and selecting the image quality of the next TS file in consideration of the bitrate and the amount of buffer that has already been loaded.

15 Claims, 10 Drawing Sheets

(56) References Cited

U.S. PATENT DOCUMENTS

| | | | | |
|---|---|---|---|---|
| 2013/0170561 A1* | 7/2013 | Hannuksela | ......... | H04N 19/188 375/240.25 |
| 2014/0025830 A1* | 1/2014 | Grinshpun | ............ | H04L 5/0064 709/227 |
| 2015/0244751 A1* | 8/2015 | Lee | ........................ | H04L 65/80 709/219 |
| 2016/0232641 A1* | 8/2016 | Kamath | .................... | G06T 5/00 |

FOREIGN PATENT DOCUMENTS

| | | | | |
|---|---|---|---|---|
| JP | 5669818 B2 | 2/2015 | | |
| KR | 101182550 B1 | 9/2012 | | |
| KR | 1020140047575 A | 4/2014 | | |
| KR | 1020150046655 A | 4/2015 | | |
| KR | 101638509 B1 | 7/2016 | | |
| KR | 1020180077379 A | 7/2018 | | |
| WO | WO-2005079009 A1 * | 8/2005 | ............. | H04L 47/10 |
| WO | WO-2009149100 A1 * | 12/2009 | ............. | G06F 15/16 |

* cited by examiner

METHOD AND SYSTEM FOR EFFECTIVE ADAPTIVE BITRATE STREAMING

CROSS-REFERENCE TO RELATED APPLICATIONS

This is a continuation application of International Application No. PCT/KR2020/004004, filed Mar. 24, 2020, which claims the benefit of Korean Patent Application No. 10-2019-0038956, filed Apr. 3, 2019.

BACKGROUND OF THE INVENTION

Field of Invention

One or more example embodiments of the following description relate to an adaptive bitrate streaming algorithm.

Description of Related Art

In general, the Internet transmits and receives data based on a packet unit. Here, a transmission bandwidth between two terminals to communicate is not guaranteed at all times. Once a path is selected, data transmission and reception is performed while dynamically occupying a bandwidth in each packet unit.

Currently, as mass data, such as videos, starts to be widely used, a service that streams video data in real time may provide a service that meets quality of service (QoS) by transmitting video data according to a transmission bandwidth of a network.

Here, technology for measuring a bandwidth of actual transmittable data plays a very important role in transmitting data over a network. For example, technology for measuring a bandwidth of a mobile transmission network is disclosed in Korean Patent Publication No. 10-1182550 (published on Sep. 6, 2012).

BRIEF SUMMARY OF THE INVENTION

One or more example embodiments provide a method and a system that may support a seamless video playback through adaptive bitrate streaming (ABR) with better performance by reinforcing an ABR algorithm.

One or more example embodiments provide a method and a system that may change image quality without buffering when changing the image quality of a video with specific image quality.

According to at least one example embodiment, there is provided a video playback method implemented by a computer system having at least one processor configured to execute computer-readable instructions included in a memory, the video playback method including measuring, by the at least one processor, a bitrate based on a transport stream (TS) file unit; and selecting, by the at least one processor, image quality of a next TS file in consideration of the bitrate and a buffer amount already loaded.

According to an aspect, the measuring of the bitrate may include measuring the bitrate every time the loading of the TS file is completed.

According to another aspect, the measuring of the bitrate may include converting the size of a loaded TS file to a weight value and pushing the same to a queue in chronological order; and sorting data of the queue based on the weight value and then determining a median value as a current bitrate.

According to still another aspect, the selecting of the image quality of the next TS file may include, when the selected image quality is higher image quality than the current image quality, changing the current image quality with the higher image quality if the buffer amount meets a minimum standard for changing image quality in consideration of the bitrates of the current image quality and the selected image quality.

According to still another aspect, the selecting of the image quality of the next TS file may include, when the selected image quality is lower image quality than the current image quality, changing the current image quality with the lower image quality if the buffer amount is less than the buffer threshold value of the selected image quality.

According to still another aspect, the selecting of the image quality of the next TS file may include modifying an index to download with the selected image quality from not a TS file loaded at a last location but the next TS file thereof.

According to still another aspect, the selecting of the image quality of the next TS file may include, when the selected image quality is higher image quality than the current image quality, adjusting the loaded buffer amount to advance load a TS file with the higher image quality; and when the selected image quality is lower image quality than the current image quality, loading a TS file with the lower image quality at a point in time after consuming all the loaded buffer amount.

According to at least one example embodiment, there is provided a non-transitory computer-readable recording medium storing instructions that, when executed by a processor, cause the processor to perform the video playback method in the computer system.

According to at least one example embodiment, there is provided a computer system having at least one processor configured to execute computer-readable instructions included in a memory. The at least one processor includes a bitrate measurer configured to measure a bitrate based on a TS file unit; and a video player configured to select the image quality of the next TS file in consideration of the bitrate and a buffer amount already loaded.

According to example embodiments, it is possible to support a seamless video playback through adaptive bitrate streaming (ABR) with better performance by reinforcing an ABR algorithm.

According to example embodiments, it is possible to change image quality without buffering when changing the image quality of a video with specific image quality.

DETAILED DESCRIPTION OF THE INVENTION

Hereinafter, example embodiments will be described with reference to the accompanying drawings.

The example embodiments relate to technology for playing back a video through an effective adaptive bitrate streaming (ABR) algorithm.

The example embodiments including disclosures herein may support a seamless video playback by changing image quality in real time in consideration of all of a loaded buffer amount and a network speed and, through this, may achieve many advantages in terms of enhancement in quality of service (QoS), effectiveness, cost saving, and the like.

Figure 1:
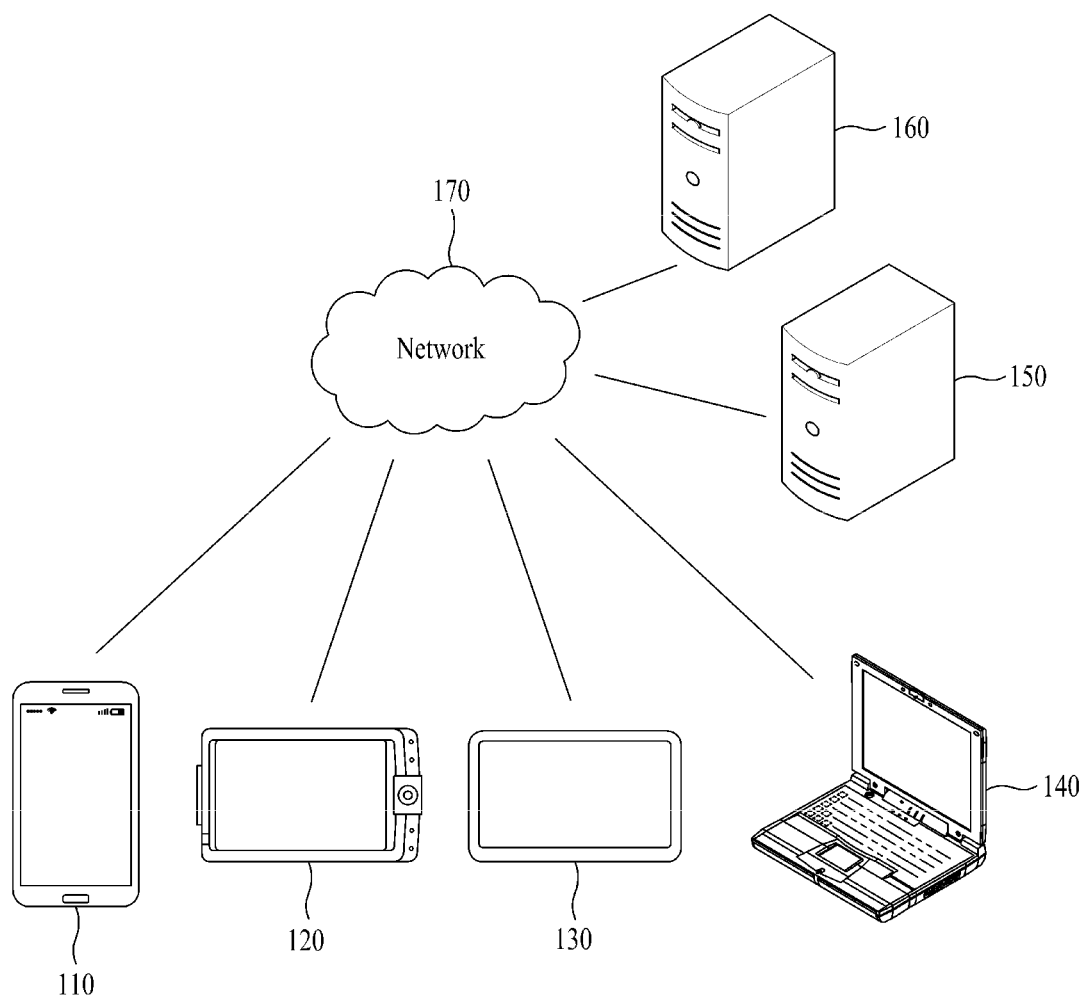
FIG. 1 is a diagram illustrating an example of a network environment according to an example embodiment.

FIG. 1 is a diagram illustrating an example of a network environment according to one example embodiment. Referring to FIG. 1, the network environment includes a plurality of electronic devices 110, 120, 130, and 140, a plurality of servers 150 and 160, and a network 170. FIG. 1 is provided as an example only and thus, a number of electronic devices or a number of servers are not limited thereto.

Each of the plurality of electronic devices 110, 120, 130, and 140 may be a fixed terminal or a mobile terminal configured as a computer system. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet personal computer (PC), a game console, a wearable device, an Internet of things (IoT) device, a virtual reality (VR) device, and an augmented reality (AR) device. For example, although FIG. 1 illustrates the shape of a smartphone as an example of the electronic device 110, the electronic device 110 may indicate one of various physical computer systems capable of communicating with other electronic devices 120, 130, and 140, and/or the servers 150 and 160 over the network 170 in a wireless communication manner or in a wired communication manner.

The communication scheme is not particularly limited and may include a communication method using a near field communication between devices as well as a communication method using a communication network (e.g., a mobile communication network, the wired Internet, the wireless Internet, a broadcasting network, a satellite network etc.) which may be included in the network 170. For example, the network 170 may include at least one of network topologies that include, for example, a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, it is provided as an example only and the example embodiments are not limited thereto.

Each of the servers 150 and 160 may be configured as a computer apparatus or a plurality of computer apparatuses that provides instructions, codes, files, contents, services, and the like, through communication with the plurality of electronic devices 110, 120, 130, and 140 over the network 170. For example, the server 150 may be a system that provides a first service to the plurality of electronic devices 110, 120, 130, and 140 connected over the network 170. The server 160 may be a system that provides a second service to the plurality of electronic devices 110, 120, 130, and 140 connected over the network 170. In detail, for example, the server 150 may provide the plurality of electronic devices 110, 120, 130, and 140 with a service (e.g., an HTTP live streaming (HLS)-based video service) desired by a corresponding application as the first service through the application as a computer program that is installed and runs on the plurality of electronic devices 110, 120, 130, and 140. As another example, the server 160 may provide a service for distributing a file for installing and running of the application to the plurality of electronic devices 110, 120, 130, and 140 as the second service.

Figure 2:
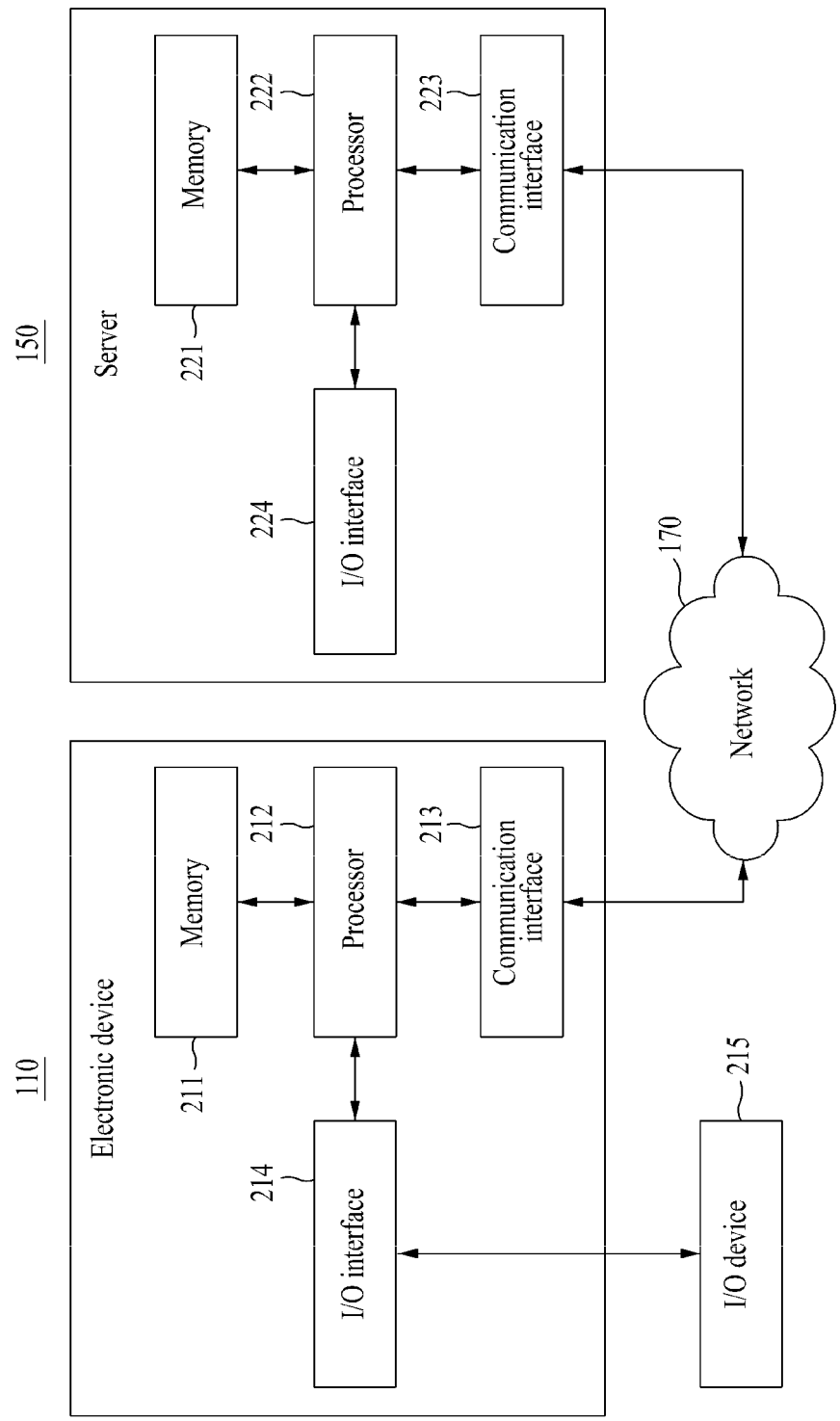
FIG. 2 is a block diagram illustrating a configuration of an electronic device and a server according to an example embodiment.

FIG. 2 is a block diagram illustrating an example of an electronic device and a server according to at least one example embodiment. FIG. 2 illustrates a configuration of the electronic device 110 as an example for a single electronic device and illustrates a configuration of the server 150 as an example for a single server. The same or similar components may be applicable to other electronic devices 120, 130, and 140, or the server 160.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as a random access memory (RAM), a read only memory (ROM), a disk drive, a solid state drive (SSD), and a flash memory, as a non-transitory computer-readable recording medium. The permanent mass storage device, such as ROM, SSD, flash memory, and disk drive, may be included in the electronic device 110 or the server 150 as a permanent storage device separate from the memory 211, 221. Also, an OS or at least one program code (e.g., a code for a browser installed and running on the electronic device 110 or an application installed and running on the electronic device 110 to provide a specific service) may be stored in the memory 211, 221. Such software components may be loaded from another computer-readable recording medium separate from the memory 211, 221. Another computer-readable recording medium may include a computer-readable recording medium, for example, a floppy drive, a disk, a tape, a DVD/CD-ROM drive, a memory card, etc. According to other example embodiments, software components may be loaded to the memory 211, 221 through the communication module 213, 223, instead of the computer-readable recording medium. For example, at least one program may be loaded to the memory 211, 221 based on a computer program (e.g., the application) installed by files provided over the network 170 from developers or a file distribution system (e.g., the server 160) which provides an installation file of the application.

The processor 212, 222 may be configured to process instructions of a computer program by performing basic arithmetic operations, logic operations, and I/O operations. Instructions may be provided from the memory 211, 221 or the communication module 213, 223 to the processor 212, 222. For example, the processor 212, 222 may be configured to execute received instructions in response to a program code stored in a storage device, such as the memory 211, 221.

The communication module 213, 223 may provide a function for communication between the electronic device 110 and the server 150 over the network 170 and may provide a function for communication between the electronic device 110 and/or the server 150 and another electronic device (e.g., the electronic device 120) or another server (e.g., the server 160). For example, the processor 212 of the electronic device 110 may transfer a request created based on a program code stored in the storage device, such as the memory 211, to the server 150 over the network 170 under the control of the communication module 213. Inversely, a control signal or an instruction, content, a file, etc., provided under the control of the processor 222 of the server 150 may be received at the electronic device 110 through the communication module 213 of the electronic device 110 by going through the communication module 223 and the network 170. For example, a control signal or an instruction, content, a file, etc., of the server 150 received through the communication module 213 may be transferred to the processor 212 or the memory 211, and content, a file, etc., may be stored in a recording medium (e.g., the permanent storage device) further includable in the electronic device 110.

The I/O interface 214 may be a device used for interfacing with an I/O device 215. For example, an input device of the I/O device 215 may include a device, such as a keyboard, a mouse, a microphone, and a camera, and an output device of the I/O device 215 may include a device, such as a display, a speaker, and a haptic feedback device. As another example, the I/O interface 214 may be a device for interfacing with an apparatus in which an input function and an output function are integrated into a single function, such as a touchscreen. The I/O device 215 may be configured as a single device with the electronic device 110. Also, the I/O interface 224 of the server 150 may be a device for interfacing with an apparatus (not shown) for input or output that may be connected to the server 150 or included in the server 150. In detail, when processing instructions of a computer program is loaded to the memory 211, the processor 212 of the electronic device 110 may display a service screen configured using data provided from the server 150 or the electronic device 120, or may display content on a display through the I/O interface 214.

Also, according to other example embodiments, the electronic device 110 and the server 150 may include a greater number of components than the number of components shown in FIG. 2. For example, the electronic device 110 may include at least a portion of the I/O device 215, or may further include other components, for example, a transceiver, a global positioning system (GPS) module, a camera, a variety of sensors, a database (DB), and the like. In detail, if the electronic device 110 is a smartphone, the electronic device 110 may be configured to further include a variety of components, for example, an accelerometer sensor or a gyro sensor, a camera module, various physical buttons, a button using a touch panel, an I/O port, a vibrator for vibration, etc., which are generally included in the smartphone.

Hereinafter, example embodiments of a method and a system for supporting a seamless video playback through effective ABR in a real-time live environment are described.

An ABR algorithm refers to technology that plays back a video by selecting appropriate image quality in real time according to the state of the network.

The example embodiments implement ABR with better performance by reinforcing an existing ABR algorithm.

Figure 3:
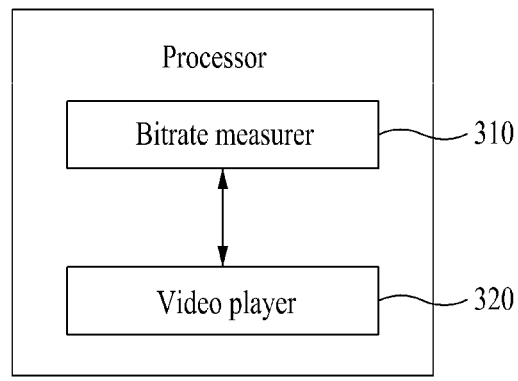
FIG. 3 is a block diagram illustrating an example of a component includable in a processor of an electronic device according to an example embodiment.
Figure 4:
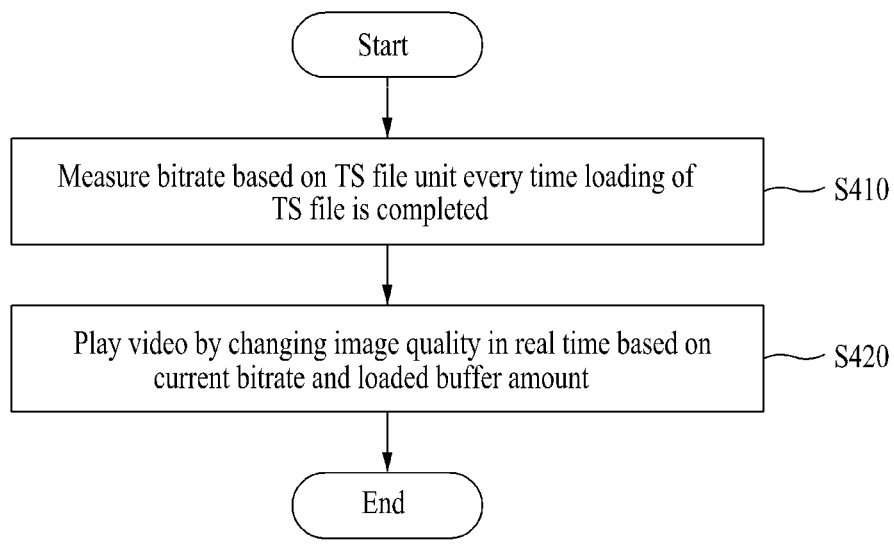
FIG. 4 is a flowchart illustrating an example of a method performed by an electronic device according to an example embodiment.

FIG. 3 is a diagram illustrating an example of a component includable in the processor 212 of the electronic device 110 according to an example embodiment, and FIG. 4 is a flowchart illustrating an example of a method performed by the electronic device 110 according to an example embodiment.

A video playback system implemented as a computer may be configured in the electronic device 110 according to an example embodiment. For example, the video playback system may be implemented in a form of a program that independently operates or may be implemented in an in-app form of a specific application to be operable on the specific application, and may provide a video service through interaction with the server 150 depending on cases.

The video playback system implemented in the electronic device 110 may perform the video playback method of FIG. 4 in response to an instruction provided from an application installed in the electronic device 110.

Referring to FIG. 3, to perform the video playback method of FIG. 4, the processor 212 of the electronic device 110 may include a bitrate measurer 310 and a video player 320. Depending on example embodiments, the components of the processor 212 may be selectively included in or excluded from the processor 212. Also, depending on example embodiments, the components of the processor 212 may be separated or merged for functional representation of the processor 212.

The processor 212 and the components of the processor 212 may control the electronic device 110 to perform operations S410 and S420 included in the video playback method of FIG. 4. For example, the processor 212 and the components of the processor 212 may be configured to execute an instruction according to a code of at least one program and a code of an OS included in the memory 211.

Here, the components of the processor 212 may be representations of different functions of the processor 212 performed by the processor 212 according to an instruction provided from a program code stored in the electronic device 110 (e.g., an instruction provided from an application that runs on the electronic device 110). For example, the bitrate measurer 310 may be used as a functional representation of the processor 212 that controls the electronic device 110 to measure the current bitrate according to the instruction.

The processor 212 may read a necessary instruction from the memory 211 to which instructions related to the control of the electronic device 110 are loaded. In this case, the read instruction may include an instruction for controlling the processor 212 to perform the following operations S410 and S420.

In operation S410, the bitrate measurer 310 may measure a bitrate based on a transport stream (TS) file unit every time the loading of a TS file is completed. In an HLS-based video service, a playback is performed based on a TS file unit. Therefore, to select which quality TS to download when loading the next TS file, the bitrate may be measured and updated every time the loading of a single TS file is completed.

A bitrate may be measured in the following manner.

Figure 5:
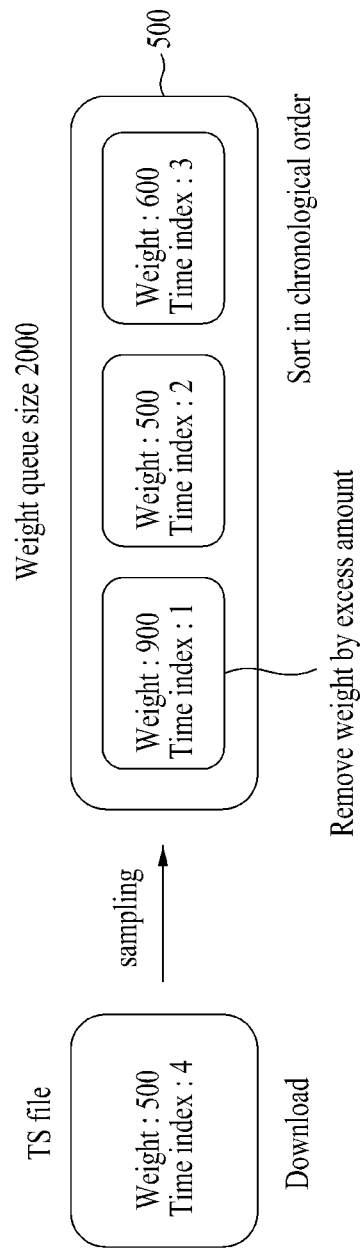
FIGS. 5 and 6 illustrate a process of measuring a bitrate according to an example embodiment.
Figure 6:
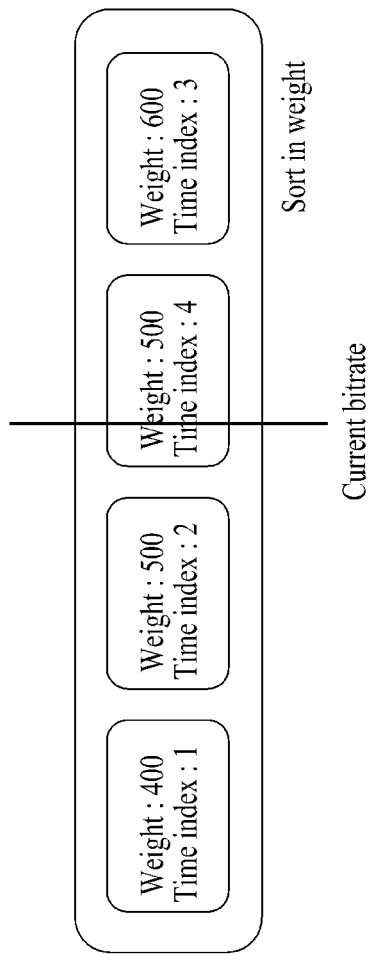

FIGS. 5 and 6 illustrate a process of measuring a bitrate according to an example embodiment.

Referring to FIG. 5, the bitrate measurer 310 may convert the size of a loaded TS file to a weight value and then push the same to a weight queue 500 (i.e., a waiting list for weight values) in chronological order. For example, the bitrate measurer 310 may sample the loaded TS file based on a predetermined size and may apply a square root of the sampled TS file size as a weight value. When the weight queue 500 has a maximum weight size of 2000 (4 MB), if the total weight sum of data in the weight queue 500 exceeds 2000, the weight of data by an excess amount may be removed sequentially from old data, i.e., the data that entered the weight queue 500 first. Referring to FIG. 6, the bitrate measurer 310 may sort data in the weight queue 500 in ascending order based on a weight value and then may determine a median value of data sorted as the current bitrate like a moving median measurement scheme.

Therefore, the bitrate measurer 310 may measure a bitrate every time the loading of a single TS file is completed. Here, more stable bitrate measurement may be ensured by assigning a weight in consideration of a characteristic of the bitrate with frequent large and small fluctuations.

Referring again to FIG. 4, in operation S420, the video player 320 may support a seamless video playback by changing image quality in real time in consideration of a loaded buffer amount and the current bitrate measured in operation S410. That is, the video player 320 may select suitable image quality in consideration of the current bitrate and the loaded buffer amount when loading the next TS file.

There are some disadvantages in an existing video player: 1) A load buffer amount is small, from a minimum of 15 seconds to a maximum of 50 seconds. 2) When changing image quality, a TS file loaded at the last location is downloaded again. 3) Although image quality is changed from low image quality to high image quality through enhancement of the network speed, the low image quality of the pre-loaded file needs to be continuously viewed.

An ABR algorithm according to an example embodiment for outperforming the disadvantages found in the existing player is as follows.

Figure 7:
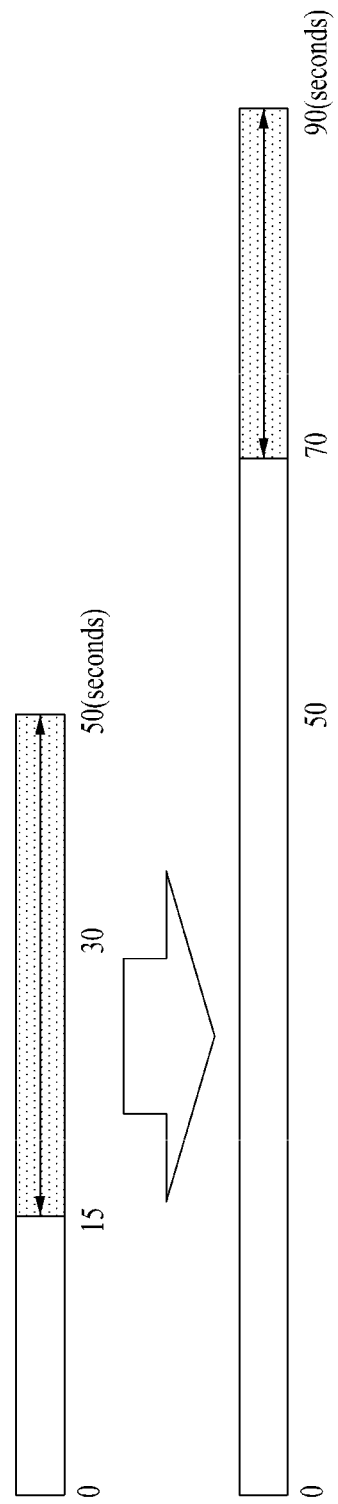
FIGS. 7 and 8 illustrate a process of designating a buffer threshold value for each image quality by increasing a load buffer amount according to an example embodiment.

Describing a data loading and consumption process of the existing video player with reference to FIG. 7, data is continuously loaded until a loaded buffer amount reaches 50 seconds and, once the loaded buffer amount reaches 50 seconds, data of the buffer is consumed, i.e., processed, without loading data until the loaded buffer amount reaches 15 seconds. In such an environment, if the network speed changes to 640 kbps after buffer loading to a maximum of 50 seconds at a network speed of 3264 kbps, about 20 seconds 3264×4)/640) is required with assumption that a single TS file is 4 seconds. However, in a state in which a remaining buffer is less than 20 seconds, buffering occurs unconditionally, which may cause image cutoff.

Herein, a minimum buffer amount for an initial playback may be 2.5 seconds, a minimum buffer amount for a playback in a rebuffering state (i.e., a minimum buffer amount capable of changing image quality) may be 5 seconds, and an initial bitrate value may be set to 0. In particular, a buffer size maintained during streaming may be defined from a minimum of 70 seconds to a maximum of 90 seconds. Describing a data loading and consumption process herein with reference to FIG. 7, data is continuously loaded until the loaded buffer amount reaches 90 seconds and, once the loaded buffer amount reaches 90 seconds, data of the buffer is consumed without loading data until the loaded buffer amount reaches 70 seconds.

If the network speed increases, the video player 320 may load the next TS file by selecting higher image quality corresponding to the network speed. In the case of selecting higher image quality, whether a buffer amount is sufficient to enhance image quality is calculated in consideration of the minimum buffer amount of 2.5 seconds for a playback and a bitrate ratio between the selected image quality and the current image quality. Here, if the buffer amount is sufficient, the video player 320 changes the current image quality with the higher image quality and, otherwise, maintains the current image quality. For example, assuming that the bitrate of the current image quality is 1000 and a bitrate of the selected image quality is 2000, if the buffer amount satisfies the predetermined minimum standard of 5 seconds, the video player 320 may change the current image quality with the higher image quality.

Figure 8:
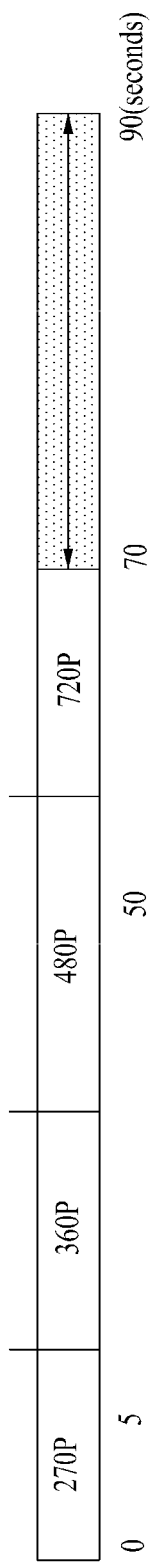

If the network speed decreases, the video player 320 may load the next TS file by selecting lower image quality corresponding to the network speed. For the lower image quality, a buffer guideline value needs to be calculated in advance for each image quality. Referring to FIG. 8, a buffer threshold value may be designated for each image quality.

A buffer guideline is calculated from a minimum of 2.5 seconds to a maximum of 60 seconds in consideration of a bitrate ratio for each image quality. When the minimum buffer guideline value is m, the maximum buffer guideline value is M, the highest bitrate of image quality provided is H, and the lowest bitrate thereof is L, a buffer guideline value corresponding to the bitrate of an i-th image quality is given by the following Equation 1.

$$(M-m) \times (i\text{-bitrate}-L)/(H-L)+m \quad \text{[Equation 1]}$$

For example, if a total image quality list {image quality: bitrate}=[{270P:1000}, {360P:2000}, {480P:3000}, {720P: 4000}] is provided, 480P buffer guideline value corresponds to {(60×1000−2.5×1000)×3000−1000)/(4000−1000)+2.5× 1000}.

When the network speed decreases, the video player 320 changes the current image quality with lower image quality if a buffer amount is less than a guideline value (i.e., a buffer threshold value) and otherwise, maintains the current image quality (i.e., if the buffer amount is sufficient).

In the case of changing image quality according to the network speed (i.e., a bitrate), the video player 320 may modify an index to download from the next TS file location without redownloading a TS file loaded at the last location. In the case of redownloading the TS file at the last location as a TS file with image quality desired to change with, the buffer is wasted as much as a size corresponding to a single TS file. In contrast, according to an example embodiment, an index of the next TS file to be loaded may be recalculated and applied to download from not the TS file at the last location but the next TS file with the desired image quality.

Also, in the case of changing the image quality of a video with higher image quality due to enhancement in the network speed, the video player 320 may adjust the loaded buffer amount such that the user may enjoy the higher image quality.

Figure 9:
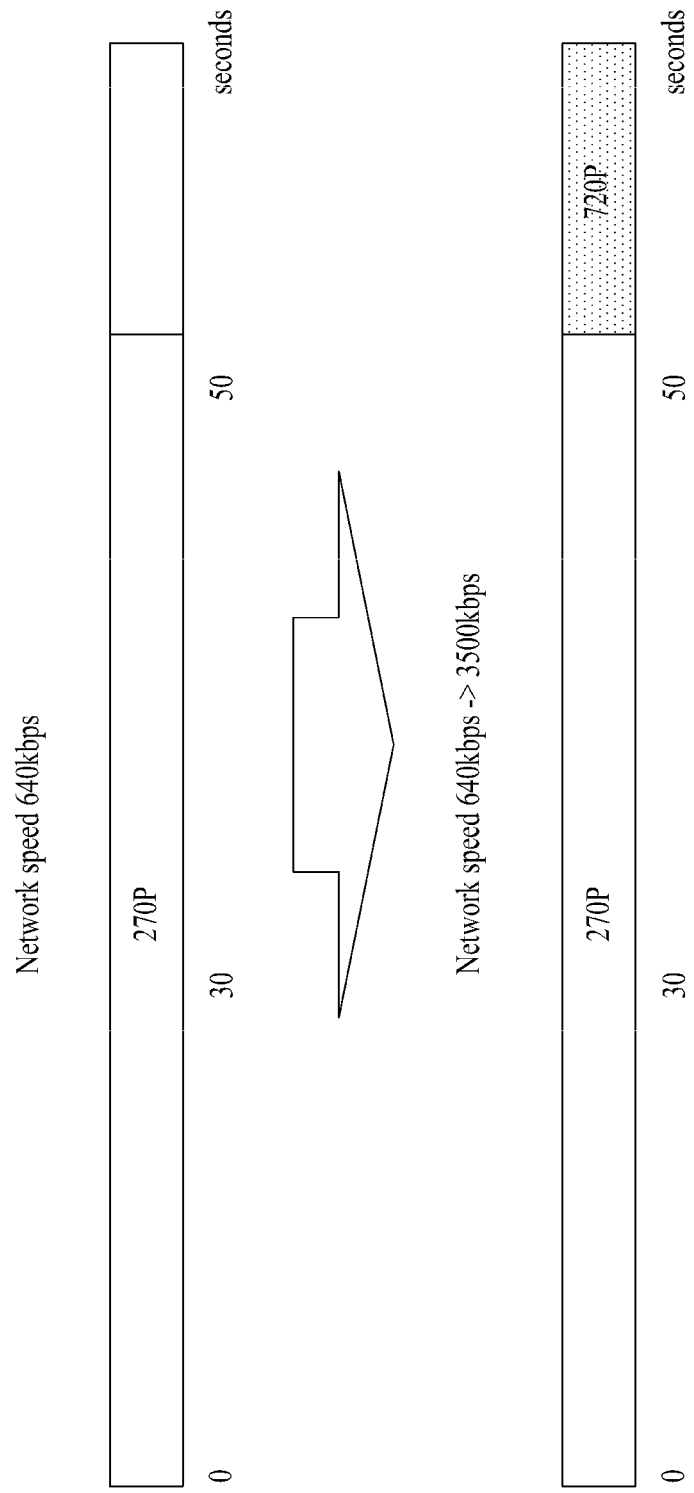
FIG. 9 illustrates a data loading process of an existing scheme.

Referring to FIG. 9, if a network speed is enhanced to 3500 kbps after filling a buffer with 270P image quality for about 50 seconds in a state in which the network speed is 640 kbps, the user needs to enjoy the 270P image quality by a loaded buffer amount, that is, for about 50 seconds regardless of the change of the image quality from 270P to 720P.

Figure 10:
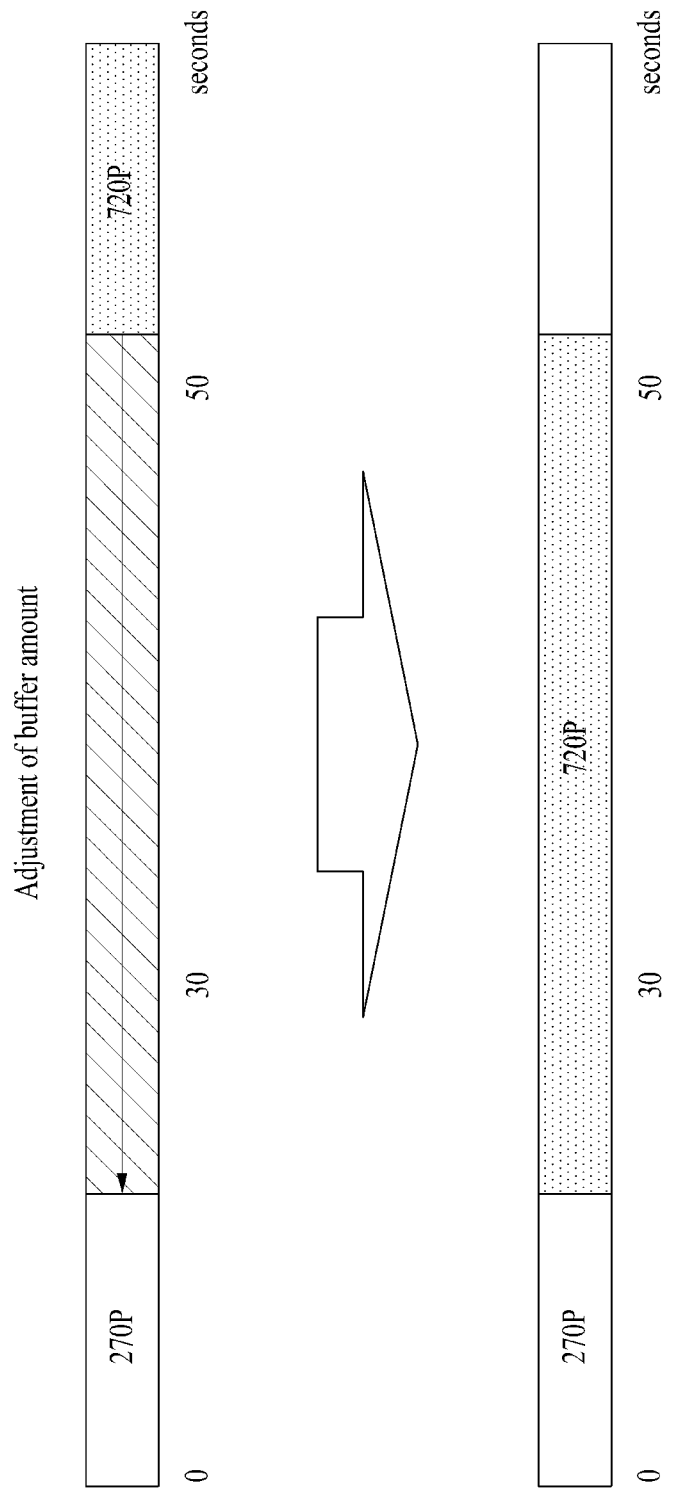
FIG. 10 illustrates a data loading process when changing image quality from low image quality to high image quality according to an example embodiment.

To solve this, referring to FIG. 10, when image quality is changed from low image quality 270 to high image quality 720 through enhancement of the network speed, the video player 320 may load a TS file of 720P earlier by adjusting the buffer amount loaded with 270P. Here, the video player 320 may quickly adjust the buffer amount to maintain only an amount corresponding to about a size of one or two TS files with low image quality data.

Figure 11:
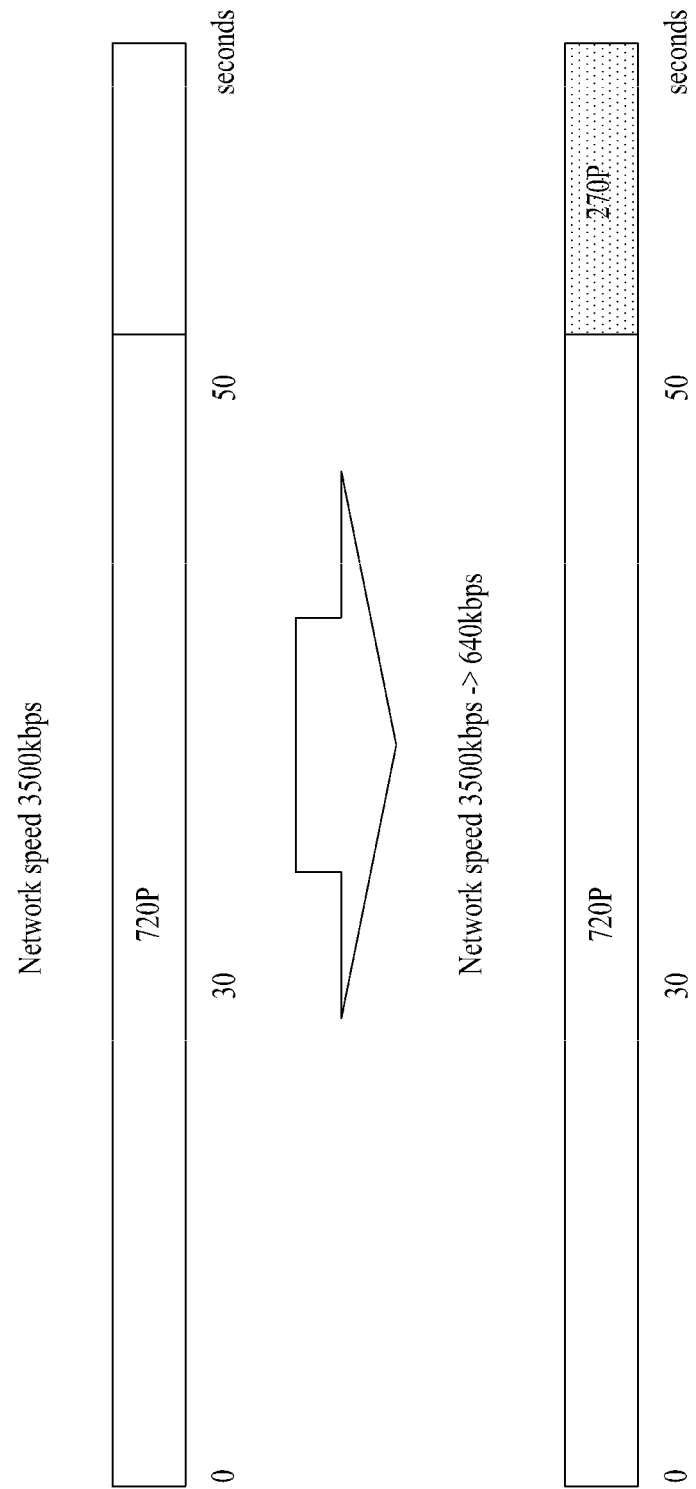
FIG. 11 illustrates a data loading process when changing image quality from high image quality to low image quality according to an example embodiment.

In contrast, referring to FIG. 11, when a network speed drops to 640 kbps after filling a buffer with 720P image quality for about 50 seconds in a state in which the network speed is 3500 kbps, the loaded buffer amount is not adjusted and high image quality is maintained as much as possible by the loaded buffer amount, that is, for about 50 seconds.

In addition to automatically changing the image quality according to the network speed, the image quality may be changed with specific image quality through a direction selection from the user. Likewise, the image quality may be changed without buffering using a loaded buffer. In the case of selecting and changing from low image quality to high image quality, high image quality data may be quickly loaded after adjusting the loaded buffer amount to maintain only a portion of low image quality data. In the case of selecting and changing from high image quality to low image quality, the low image quality data may be loaded at a point in time after consuming all the high image quality data while maintaining the high image quality data as is without adjusting the loaded buffer amount.

Therefore, the video player 320 may adjust the loaded buffer amount such that the user may view a video with high image quality as long as possible and low image quality as short as possible.

An ABR algorithm according to an example embodiment does not cause buffering except for initial loading and may support a seamless video playback by changing the image quality in real time in consideration of both the loaded buffer amount and the network speed. Since it is possible to enhance an interruption caused by frequent buffering during streaming playback users are dissatisfied with, it is possible to dissolve user dissatisfaction and provide a high-quality playback environment.

According to example embodiments, it is possible to support high image quality as long as possible and low image quality as short as possible, and to support a change of image quality and a video playback sensitively when a network speed rises and slowly when the network speed drops.

The apparatuses described herein may be implemented using hardware components, software components, and/or a combination thereof. For example, the apparatuses and the components described herein may be implemented using one or more general-purpose or special purpose computers having a processing device, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

Software may include a computer program, a piece of code, an instruction, or some combinations thereof, for independently or collectively instructing or configuring the processing device to operate as desired. Software and/or data may be embodied in any type of machine, component, physical equipment, virtual equipment, computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in computer-readable media. Here, the media may continuously store computer-executable programs or may transitorily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of other media may include recording media and storage media managed by an app store that distributes applications or a site that supplies and distributes other various types of software, a server, and the like.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, or replaced or supplemented by other components or their equivalents.

Therefore, other implementations, other example embodiments, and equivalents of the claims are to be construed as being included in the claims.

What is claimed is:

1. A video playback method implemented by a computer system having at least one processor configured to execute computer-readable instructions included in a memory, the video playback method comprising:
    measuring, by the at least one processor, a bitrate based on a transport stream (TS) file unit; and
    selecting, by the at least one processor, image quality of a next TS file in consideration of the bitrate and a buffer amount already loaded,
    wherein the measuring of the bitrate includes
    converting a size of a loaded TS file to a weight value and pushing the loaded TS file to a queue in chronological order; and
    sorting data in the queue based on the weight value and then determining a median value as a current bitrate.

2. The video playback method of claim 1, wherein the measuring of the bitrate comprises measuring the bitrate every time loading of the TS file is completed.

3. The video playback method of claim 1, wherein the selecting of the image quality of the next TS file comprises;
    determining that the selected image quality is higher image quality than a current image quality and determining that the buffer amount meets a minimum standard for changing image quality in consideration of bitrates of the current image quality and the selected image quality, and in response, changing the current image quality with the higher image quality.

4. The video playback method of claim 1, wherein the selecting of the image quality of the next TS file comprise, determining that the selected image quality is lower image quality than a current image quality and determining that the buffer amount is less than a buffer threshold value of the selected image quality, and in response, changing the current image quality with the lower image quality.

5. The video playback method of claim 1, wherein the selecting of the image quality of the next TS file comprises modifying an index indicating an order of download to download with the selected image quality from a next TS file thereof and not from a TS file loaded at a last location.

6. The video playback method of claim 1, wherein the selecting of the image quality of the next TS file comprises:
determining that the selected image quality is higher image quality than a current image quality, and adjusting the loaded buffer amount to advance load a TS file with the higher image quality.

7. A non-transitory computer-readable recording medium storing instructions that, when executed by a processor, cause the processor to perform the video playback method of claim 1.

8. The video playback method of claim 1, wherein the selecting of the image quality of the next TS file comprises:
determining that the selected image quality is lower image quality than a current image quality, and loading a TS file with the lower image quality at a point in time after consuming all the loaded buffer amount.

9. The video playback method of claim 1, wherein the weight value of the loaded TS file is obtained by applying a square root of the file size of the loaded TS file.

10. A computer system comprising:
at least one processor configured to execute computer-readable instructions stored in a memory,
wherein the at least one processor comprises:
a bitrate measurer configured to measure a bitrate based on a transport stream (TS) file unit; and
a video player configured to select image quality of a next TS file in consideration of the bitrate and a buffer amount already loaded,
wherein the bitrate measurer measures the bitrate by converting a size of a loaded TS file to a weight value and pushing the loaded TS file to a queue in chronological order, and sorting data in the queue based on the weight value and then determining a median value as a current bitrate.

11. The computer system of claim 10, wherein the bitrate measurer is configured to measure the bitrate every time a loading of the TS file is completed.

12. The computer system of claim 7, wherein the video player is configured to, when the selected image quality is higher image quality than current image quality, change the current image quality with the higher image quality if the buffer amount meets a minimum standard for changing the image quality in consideration of bitrates of the current image quality and the selected image quality.

13. The computer system of claim 10, wherein the video player is configured to, when the selected image quality is lower image quality than current image quality, change the current image quality with the lower image quality if the buffer amount is less than a buffer threshold value of the selected image quality.

14. The computer system of claim 10, wherein the video player is configured to modify an index indicating an order of download to download with the selected image quality from a next TS file thereof and not from a TS file loaded at a last location.

15. The computer system of claim 7, wherein the video player is configured to, when the selected image quality is higher image quality than current image quality, adjust the loaded buffer amount to advance load a TS file with the higher image quality, and to, when the selected image quality is lower image quality than the current image quality, load a TS file with the lower image quality at a point in time after consuming all the loaded buffer amount.

* * * * *